(12) United States Patent
Croq et al.

(10) Patent No.: US 6,374,104 B1
(45) Date of Patent: Apr. 16, 2002

(54) FREQUENCY AND POLARIZATION ALLOCATION FOR SATELLITE TELECOMMUNICATION SYSTEMS

(75) Inventors: Frédéric Croq, Tournefeuille; Florence Dolmeta, Cugnaux; Philippe Voisin, Tournefeuille; Didier Casasoprana, Saint Germain en Laye, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/446,424

(22) PCT Filed: Jun. 25, 1998

(86) PCT No.: PCT/FR98/01346

§ 371 Date: Mar. 1, 2000

§ 102(e) Date: Mar. 1, 2000

(87) PCT Pub. No.: WO99/00916

PCT Pub. Date: Jan. 7, 1999

(30) Foreign Application Priority Data

Jun. 26, 1997 (FR) .............................. 97 08013

(51) Int. Cl.$^7$ ............................ H04B 7/204; H04Q 7/20
(52) U.S. Cl. ...................... 455/427; 455/12.1; 455/429; 455/447
(58) Field of Search .............................. 455/12.1, 13.1, 455/13.2, 13.3, 427, 428, 429, 446, 447, 450, 451, 452; 370/316, 322, 329

(56) References Cited

U.S. PATENT DOCUMENTS

| 3,928,804 A | * | 12/1975 | Schmidt et al. ............ 370/323 |
| 4,188,578 A | * | 2/1980 | Reudink et al. ............ 370/323 |
| 4,755,777 A | * | 7/1988 | Cohen et al. ............... 333/137 |
| 4,813,036 A | * | 3/1989 | Whitehead ................. 455/13.3 |
| 5,594,941 A |   | 1/1997 | Dent ......................... 455/13.4 |
| 5,805,574 A | * | 9/1998 | Jan et al. .................... 370/329 |
| 6,173,178 B1 | * | 1/2001 | Hammill et al. ........... 455/429 |

FOREIGN PATENT DOCUMENTS

EP 0 624 008 A2 11/1994

OTHER PUBLICATIONS

E. A. Ohm, "Multifixed–beam satellite antenna with full area coverage and a rain–tolerant polarization distribution", IEEE Transactions on Antennas and Propagation, vol. 29, No. 6, Nov. 1981, New York, US, pp. 937–941, XP002062407.

* cited by examiner

*Primary Examiner*—Vivian Chang
*Assistant Examiner*—Duc Nguyen
(74) *Attorney, Agent, or Firm*—Sughrue Mion, PLLC (57) ABSTRACT

The invention concerns a telecommunications system in which the Earth is divided into areas (26) within which communications are effected by means of transmit and receive means on a spacecraft, such as a satellite, allocated to communication for a plurality of areas. Areas ($26_{10}$, $26_{11}$, $26_{12}$) of a first category (28) are allocated signals having respective polarizations ($P_D$, $P_G$) and carrier frequencies ($\Delta F_1$, $\Delta F_2$) such that two adjacent areas of the first category are allocated signals having different polarizations or carrier frequencies. Each area of a second category (30) is allocated signals having all the available polarizations and all the available carrier frequencies.

26 Claims, 5 Drawing Sheets

$A \begin{cases} P_D \\ \Delta F_1 \end{cases}$

$B \begin{cases} P_D \\ \Delta F_2 \end{cases}$ $C \begin{cases} P_G \\ \Delta F_1 \end{cases}$ $D \begin{cases} P_G \\ \Delta F_2 \end{cases}$

FREQUENCY AND POLARIZATION ALLOCATION FOR SATELLITE TELECOMMUNICATION SYSTEMS

BACKGROUND OF THE INVENTION

The present invention concerns a telecommunications system providing high data bit rates and minimum propagation times.

Systems including a network of satellites in low Earth orbit, at an altitude in the range from 1000 km to 1500 km, for example, have already been proposed for providing high bit rate communication between terrestrial mobiles or stations in a particular geographical area covering several hundred kilometers. In such systems, each satellite includes groups of receive and transmit antennas and each group is dedicated to a given area. Within each group, the receive antennas receive the signals from a station in the area and the transmit antennas relay the received signals to another station in the same area. As the satellite moves, the antennas of a group point towards the area at all times so long as the area remains within the field of view of the satellite. Accordingly, for each satellite, a region of the Earth is divided into n areas, and when the satellite moves over a region, a group of transmit and receive antennas is allocated to each area and points toward that area at all times.

In this way, switching from one antenna to another while the satellite is moving over a region, which takes around twenty minutes, for example, which could be prejudicial to the speed or the quality of communication, is avoided because only one group of transmit and receive antennas is allocated to the area.

Furthermore, the low altitude of the satellites minimizes propagation times, which is favorable to interactive communications, especially for "multimedia" applications.

SUMMARY OF THE INVENTION

The invention aims to optimize the equipment onboard the satellites and in the various areas.

To optimize the telecommunications system, the invention proposes to separate the areas into at least two categories. The first category comprises areas in which the demand for communication, or traffic, is below a threshold, and the second category comprises areas in which the demand is greater than or equal to the threshold. The respective polarizations and carrier frequencies of signals received and transmitted in each area of the first category (low traffic) are chosen so that signals having different polarizations or different carrier frequencies are allocated to two adjacent areas. Signals having all available polarizations and all available carrier frequencies are allocated to each area of the second category (high traffic).

In this way limited resources are allocated to areas of the first category and all the signal resources are allocated to areas of the second category.

The polarization is either circular or linear.

The above approach matches the equipment used to what is required. In particular, equipment for low traffic areas can be of simple design. The constraints imposed on the transmit and receive antennas on a satellite or a spacecraft which are allocated to low traffic areas are then less severe than the constraints imposed on the antennas for high traffic areas.

It has been found that the high traffic areas in each region amount to only approximately 25% of the total number of areas, although they account for from 40% to 50% of the total traffic.

The satellite transmit and receive antennas allocated to low traffic areas are active antennas, for example, i.e. antennas whose radiation patterns are formed and pointed entirely by electronic means. The shape of the pattern is also modified by electronic means. Note that modifying the shape of the pattern, which is specific to the field of telecommunications, is necessary because the shape of the radiation transmitted towards the ground varies with the position of the satellite relative to the area. For example, if the area to be covered on the ground is circular, the satellite at the nadir of that area "sees" a circular area. In contrast, as the satellite moves away from this position it sees the area as an ellipse.

Mechanically pointed antennas are used for high traffic areas, e.g. in association with preferably-electronic means for modifying the radiation pattern as a function of orientation, i.e. for matching the radiation pattern to the shape of the area "seen" by the antenna.

BRIEF DESCRIPTION OF THE DRAWING

Other features and advantages of the invention become apparent from the following description of some embodiments of the invention given with reference to the accompanying drawings, in which.

BRIEF DESCRIPTION OF THE DRAWING

Figure 1:
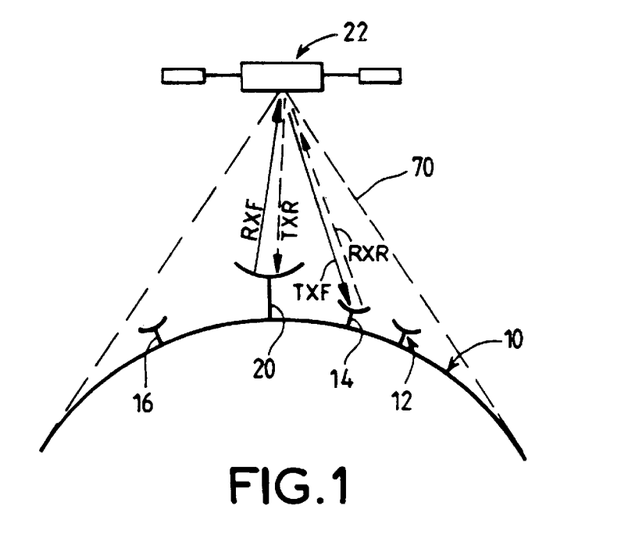
FIG. 1 is a diagram showing a telecommunications system linking terrestrial mobiles or stations using a system of satellites.

The example described concerns a telecommunications system using a constellation of satellites in low Earth orbit at an altitude of approximately 1300 km above the surface 10 of the Earth (FIG. 1).

The system has to set up calls between users 12, 14, 16 via one or more connecting stations 20. It also sets up calls between users and service providers (not shown) connected to a connection station. These calls are handled by a satellite 22.

Four types of signal are used in calls between, on the one hand, the users 12, 14, 16 and the connection station 20 and, on the other hand, the satellite 22, namely: signals TXF from the satellite 22 to the users, signals RXR from the users 12, 14, 16 to the satellite 22, signals TXR from the satellite 22 to the connection station 20, and signals RXF from the connection station to the satellite 22. It should be mentioned here that the suffix F means "forward" (the direction from the connection station to the users) and R means "return" is (the direction from the users to the connection station). Also, in the conventional way, TX means "transmit" and RX means "receive". Here transmission and reception are defined relative to the satellite.

In the above system, the satellite 22 sees a region 24 of the Earth at all times (FIG. 2), and that region is divided into areas $26_1$, $26_2$, ..., $26_n$. In one example, each region 24 includes 36 areas (n=36).

Figure 2:
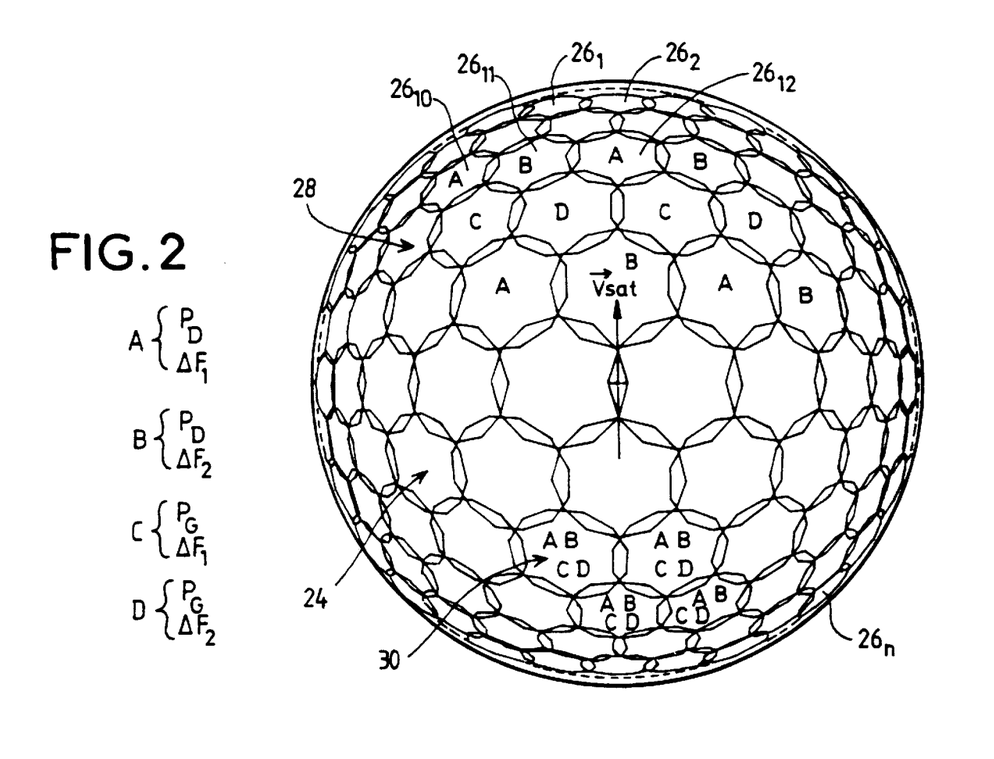
FIG. 2 is a diagram showing one distribution of traffic in the context of the system of the invention.

Each area $26_i$ is a circle with a diameter of approximately 700 km. Each region 24 is delimited by a cone 70 centered on the satellite and with an angle at the apex determined by the altitude of the satellite. A region is therefore a part of the Earth visible from the satellite. When the altitude of the satellite is 1300 km, the angle at the apex is approximately 104°.

The satellite has groups of transmit and receive antennas allocated to each area 26. Each group continues to point towards the same area as the satellite moves. In other words, the radiation pattern of each antenna is always directed towards the same terrestrial area $26_i$, in theory for as long as the satellite can see that area. The maximum demand in terms of antennas is 4n: four types of signal per area. However, according to the invention the total number of antennas is significantly less than 4n (as explained below).

The satellite provides communication between users and between the connection station and users within each area $26_i$. In contrast, communication between areas is provided by terrestrial means, for example using cables between the connection stations of the various areas that form part of the same region or different regions.

The number and the disposition of the satellites are such that an area $26_i$ sees two or three satellites at all times. In this way, when an area $26_i$ moves out of the field of vision of the satellite handling calls in that area, there is a satellite ready to take over from it and the call is switched from one satellite to the other instantaneously. However, such switching occurs relatively infrequently, for example approximately every twenty minutes, because an antenna continues to point towards the same area at all times. In practice, switching occurs when the elevation of the satellite drops below 10° for the area $26_i$ in question.

In accordance with a first aspect of the invention, at least two categories of areas corresponding to different traffic demand are provided within a region 24. The traffic demand is measured in terms of the average quantity of data transmitted per unit time and per unit surface area, for example.

Thus, in a part 28 of the region 24 (FIG. 2) there is relatively little traffic demand whereas in another part 30 the traffic demand is high. High traffic demand corresponds to urban areas of a developed country, for example, and low traffic demand corresponds to rural or relatively undeveloped areas, for example.

All the signal resources A, B, C, D are allocated to each area in the high traffic part 30.

The expression "signal resources" means a polarization characteristic and a carrier frequency band characteristic.

In this example, the polarization is either right circular ($P_D$) or left circular ($P_G$) and two separate carrier frequency bands are used: $\Delta F_1$ and $\Delta F_2$.

In FIG. 2, A signifies right circular polarization $P_D$ and a frequency band $\Delta F_1$, B signifies right circular polarization $P_D$ and a frequency band $\Delta F_2$, C corresponds to left circular polarization $P_G$ and a frequency band $\Delta F_1$, and D to left circular polarization $P_G$ and a frequency band $\Delta F_2$.

Thus, in the high traffic part 30, each area is allocated all of the resources A, B, C and D.

However, in the low traffic part 28, each area is allocated only one resource A, B, C or D. Also, the distribution of the signal resources is such that two adjacent areas do not have identical resources. The areas to which the same resource is allocated are separated by at least one area in which the resource is different. Accordingly, the area $26_{10}$ allocated resource A (right circular polarization $P_D$ and band $\Delta F_1$) is separated from the area $26_{12}$ having the same resource by the area $26_{11}$ allocated resource E (right circular polarization $P_D$, frequency band $\Delta F_2$).

Note that the carrier frequency bands $\Delta F_1$ and $\Delta F_2$ can have the same width or different widths. The carrier frequency band $\Delta F_2$ is wider than the carrier frequency band $\Delta F_1$ if some areas in part 28 have a heavier traffic demand than other areas, for example.

This separation of the region 24 into low traffic areas and high traffic areas optimizes the equipment on the satellite 22 (as explained below).

In an area like the area $26_{10}$, the antennas can receive or transmit only right circular polarization $P_D$ signals. Simpler equipment can then be used. In the areas of the part 30, on the other hand, the antenna systems must be capable of generating both circular polarizations (right and left), without interference between the signals.

With reference to the constraints on the equipment on the satellite 22, each antenna tracks an area and must sweep an angle lying in the range 100° to 120° between the area entering the field of view of the satellite and leaving it. Furthermore, the shape of the radiation pattern must vary as the satellite moves because the antenna sees an area vertically below the satellite with no deformation, i.e. as a circle, whereas it sees an area at the edge of the region, for example the area $26_1$ or $26_2$, as a smaller elongate ellipse. Because all communication possibilities must be retained for each area as the satellite moves across the region, it is necessary to be able to sweep the antennas as necessary and to control their radiation patterns as a function of the target direction.

To achieve this in the embodiment described active antennas, i.e. antennas which can be pointed and reconfigured electronically, are allocated to low traffic areas, while antennas that can be pointed mechanically and reconfigured electronically are allocated to high traffic areas.

Active antennas cater for high values of squint and can form a plurality of independent means. However, the quality of the isolation between adjacent areas is degraded for high values of squint. Active antennas are therefore unsuitable for high traffic areas. However, the chosen distribution of the signal resources for low traffic areas makes the average quality of isolation acceptable. Also, because a panel of radiating elements enables a plurality of beams to be addressed simultaneously, the choice of active antennas is well suited to low traffic areas when there is a very large number of these (for example 24), which helps to reduce the payload of each satellite.

Antennas which can be pointed mechanically and reconfigured electronically, as allocated to high traffic areas, provide the best isolation between adjacent areas because they are pointed mechanically. However, this type of antenna can be allocated to only one area. It is therefore necessary to provide at least as many antennas of this type as there are high traffic areas. However, high density areas represent only approximately 25% of the total number of areas, which limits the number of antennas needed.

There are eight to twelve high traffic areas and 16 to 24 low traffic areas per region, for example.

As indicated above, the same panel of radiating elements 40 (FIG. 4) of an active antenna on the satellite 22 can be used to transmit (or receive) signals allocated to a plurality of low traffic areas $26_{10}$, $26_{11}$, etc. Also, the same type of radiating element panel can be allocated to more than one type of signal.

Figure 3:
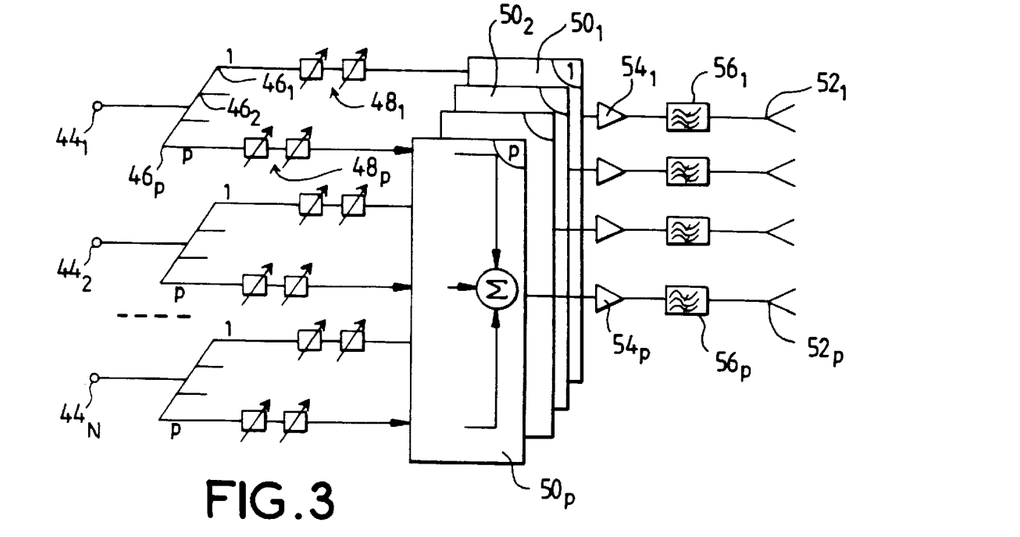
FIG. 3 is a diagram showing an antenna control circuit for a satellite of a system of the invention.

Accordingly, in the example shown in FIG. 3, the same panel comprising p radiating elements $52_1, \ldots, 52_p$ is used to transmit signals to N low-traffic areas.

The circuits 42 shown in FIG. 3 therefore have N inputs $44_1, 44_2, \ldots, 44_n$ each receiving a signal TXF (or TXR) allocated to one area.

The signal applied to an input $44_i$, for example the reference input $44_1$, is delivered to the inputs $46_1, 46_2, \ldots, 46_p$ of circuits $48_1, 48_2, \ldots, 48_p$ for amplitude attenuation a and phase variation Φ. Each signal delivered to an amplitude and phase control circuit $48_i$ of this kind is intended for a radiating element $52_i$. The control circuits $48_i$ transmit the signals applied to the input $44_1, 44_2$, etc. to the corresponding area.

The N signals allocated to the same radiating element $52_i$ are applied to respective inputs of an adder $50_i$ and the output of each adder is connected to the corresponding radiating element $52_i$ via an amplifier $54_i$ and a band-pass filter $56_i$. In the case of transmission, the amplifiers 54 are solid state power amplifiers (SSPA) and in the case of reception these amplifiers are low-noise amplifiers (LNA).

In one embodiment, the number N, i.e. the number of areas for which the same transmit (or receive) antenna is used, lies in the range from 6 to 8.

Allocating a panel of radiating elements 40 to more than one area optimizes the feed circuits. For example, given that the signals are in practice never all at their maximum power simultaneously, the power of each amplifier 54 is not equal to N times the maximum power provided for each area and can be lower.

Figure 4:
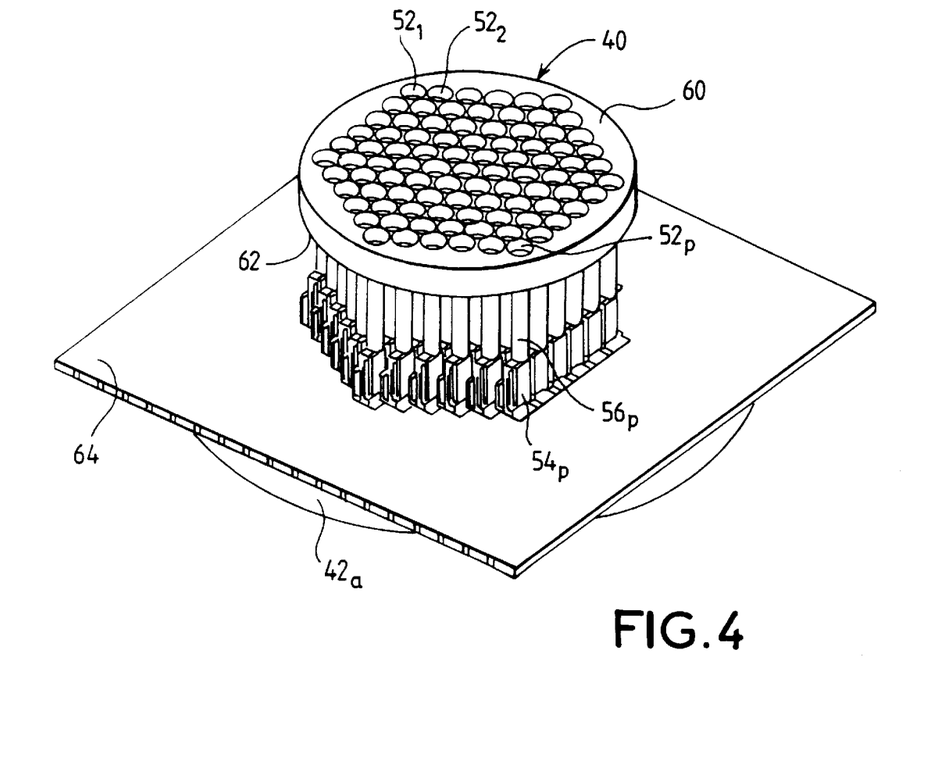
FIG. 4 is a diagram showing an antenna controlled by the circuit from FIG. 3.

FIG. 4 shows one example of the physical layout of a panel 40 of radiating elements $52_1, 52_2$, etc. The panel 40 has the general shape of a disk with a radiating face 60 and a rear face 62. The rear face receives filters $56_i$ which are waveguides having a generally cylindrical or tubular external shape. The opposite ends of these filters are connected to the amplifiers $54_i$.

The amplifiers $54_i$ are associated with a panel 64 containing a network of miniature heat pipes to evacuate the heat generated by the amplifiers $54_i$. The remainder of the circuit 42, including the amplitude and phase control components $48_i$ and the adders $50_i$, is disposed under the panel 64, on the opposite side to the panel 40.

The dimensions of the panel 40 are chosen as a function of the dimensions of each area and the maximum squint angle. Squint is the inclination of the center direction of the radiation pattern relative to the normal to the panel 40, and the maximum squint angle is therefore the half-angle at the apex of the cone 70 (FIG. 1) within which the satellite 22 sees the Earth 10. The maximum squint is in the order of 50° to 60° and it is therefore necessary to choose an area for the panel 40 that is equal to approximately four times the area that would be needed to transmit towards an area in line with the panel, in order to allow for the projected surface area of the antenna in the pointing direction and the axisymmetrical performance characteristic of the active antenna.

Also, the distance between radiating elements $52_i$ must represent a pitch that is sufficiently small to prevent the appearance of interfering lobes referred to as array lobes in the active area on the ground. In the case of a hexagonal grid, this pitch must be in the order of 0.55λ to 0.6λ, where λ is the wavelength of the signal to be transmitted by the antenna. The distance between elements is a function of the maximum squint.

Figure 5:
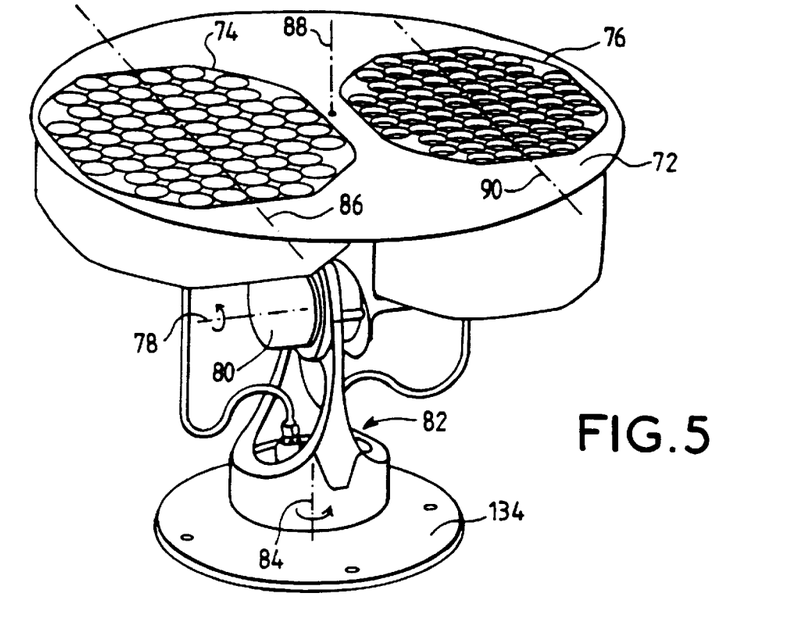
FIG. 5 is a diagram showing a transmit and receive antenna intended for a high traffic area mounted on a satellite of the system of the invention.

FIG. 5 shows an antenna for high traffic areas. It handles transmission and reception.

The antenna includes a plate 72 accommodating two panels of radiating elements 74 and 76. The panel 74 is for transmission and the panel 76 is for reception.

The support plate 72 is shown as horizontal in FIG. 5 and is pivoted about a horizontal axis 78 parallel to the plane of the plate 72 by an elevation motor 80, rotation about the axis 78 pointing it in elevation.

Another motor 82 with a vertical axis 84 is provided under the motor 80. Rotation about the axis 84 orients the plate in azimuth.

The panel 74 of transmit radiating elements is generally elliptical with a major axis 86. This elliptical shape corresponds to the shape of an area close to the horizon as seen by the antenna when the antenna is pointed towards that area, i.e. when the vertical axis 88 of the plate 72 is directed towards the area adjoining the horizon.

To be more precise, the elliptical shape is matched to the shape of an area to be covered corresponding to a pointing angle of approximately 50° when the maximum pointing angle is 54°. The axis 86 is perpendicular to the major axis of the ellipse as which an area is seen for a pointing angle of 50°.

The foregoing description clearly refers to vertical and horizontal directions in order to indicate the relative directions of the various components and not to indicate any absolute orientation.

Like the panel 74, the receive panel 76 is generally elliptical with a major axis 90 parallel to the major axis 86 of the panel 74.

The panel 74 handles both TXF signals and TXR signals. Similarly, the panel 76 handles RXF and RXR signals.

Figure 6:
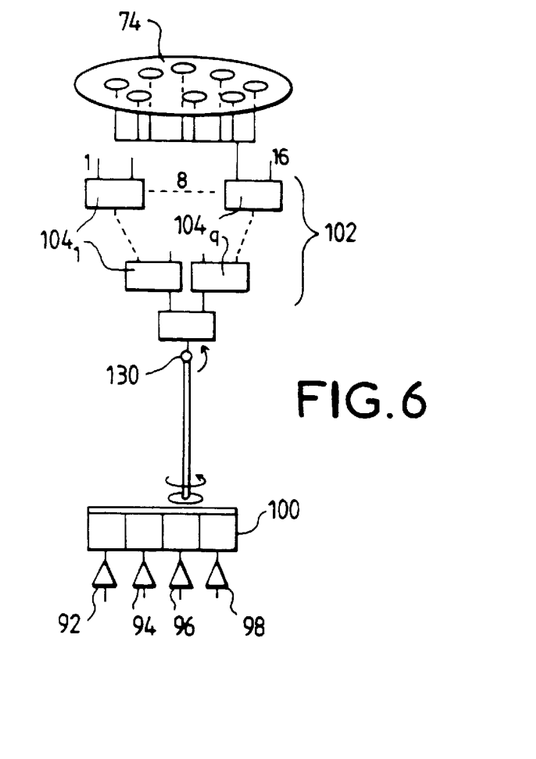
FIG. 6 is a diagram showing how a transmit antenna from FIG. 5 is controlled.

FIG. 6 is a diagram of a control circuit for the transmit panel 74. In this example there are three carrier frequency sub-bands for TXF signals (transmission towards users) and a single carrier frequency band for the TXR signals (towards the connection station). Accordingly, three amplifiers 92, 94 and 96 are allocated to the TXF signals and one amplifier 98 is provided for the TXR signals.

The FIG. 6 circuit is obviously not limited to this division into three sub-bands for the TXF signals and one band for the TXR signals. Other divisions are feasible, for example two bands for the TXF signals and two bands for the TXR signals.

The outputs of the amplifiers 92 through 98 are fed to the inputs of a multiplexer 100 which delivers signals to the radiating elements of the panel 74 via a beam-forming circuit or network 102.

In accordance with one feature of the invention, the network 102 matches the radiation pattern to the position of the satellite relative to the area to which the antenna is allocated. In other words, the axis 88 is pointed towards the corresponding area at all times by the azimuth motor 82 and the elevation motor 80 (FIG. 5), and this "mechanical" pointing is associated with electronic control 102 to match the beam to the relative position of the antenna and the area.

The beam is of circular section when the satellite is at the nadir of the area, and of elliptical section when the area adjoins the horizon (FIG. 2). To this end, and for transmission in particular, when the antenna is at the nadir only radiating elements arranged in a circle are energized; when the satellite leaves the nadir of the area, the amplitudes of the signals fed to the transmit radiating elements are controlled in order to activate other radiating elements progressively, the maximum number of radiating elements being activated when the antenna is about to lose sight of the area.

In the example, the circuit 102 includes g power distributors $104_1$ through $10q_q$. These distributors are reconfigurable; they are low-loss devices because they are on the output side of the amplifiers 92 through 98.

The power distributors $104_i$ allocate the amplitude of the signals supplied to the radiating elements of the panel 74 but not their phase. The radiating elements are not involved in pointing; it is therefore not necessary to vary the phase of the signals applied to them.

Also, it has been found that it is not necessary to control the amplitude of each radiating element individually. This is why, in one embodiment of the invention, the number c of power distributors is a sub-multiple of the number of radiating elements. In this example the number of radiating elements is 64 or 80 but the number g is 16.

This simplification stems from the observation that the radiation pattern is axisymmetrical relative to the mechanical pointing direction of the panel. Under these conditions, the radiating elements at the same distance from the center of the panel are excited with the same amplitude and can therefore be excited in the same manner, i.e. by the same components.

Figure 5A:
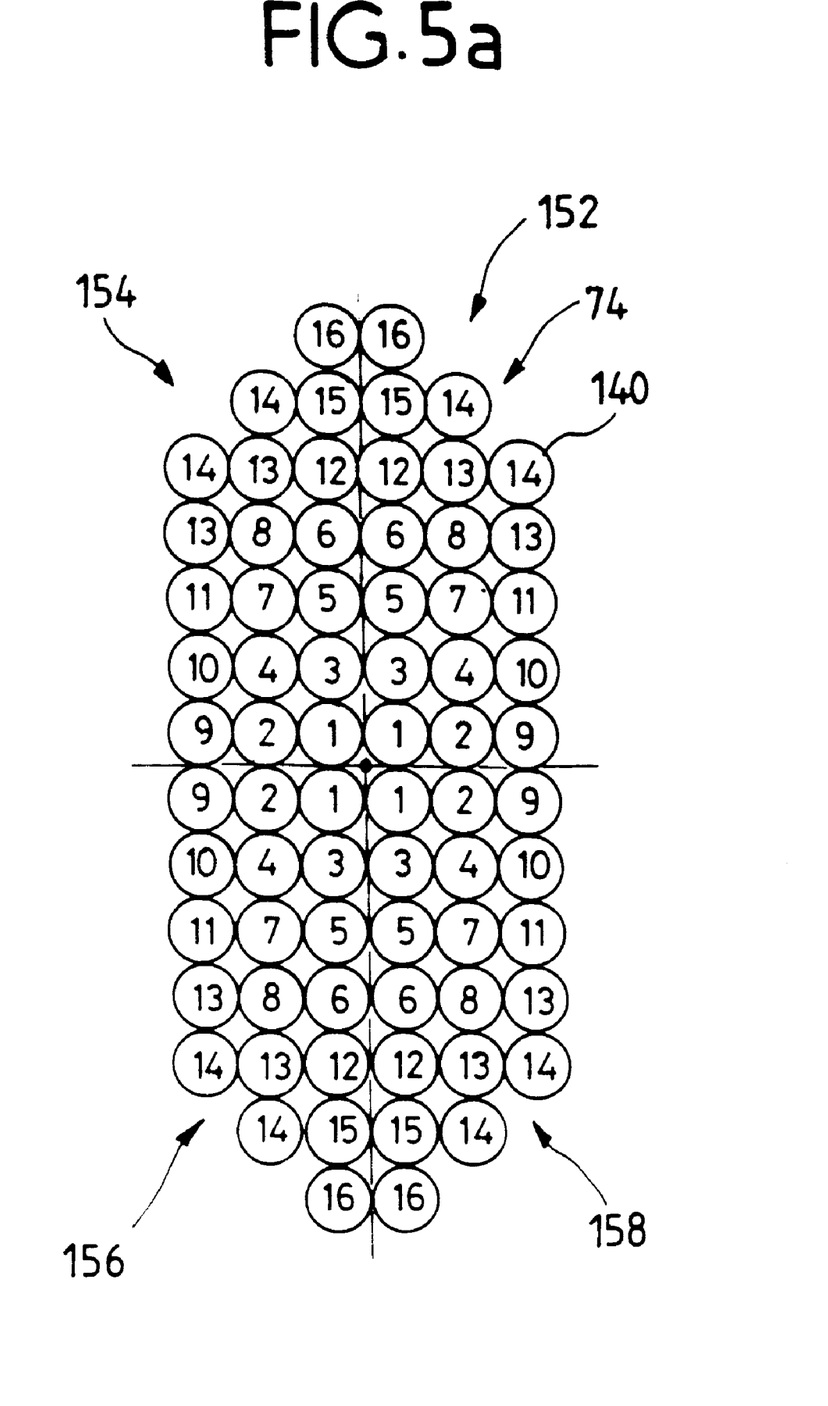
FIG. 5a is a diagram showing a radiating panel.

FIG. 5a shows one example of a panel of radiating elements disposed in an elongate shape. Each radiating element is represented by a circle 140. A number, or index, from 1 to 16 is shown inside each radiating element. Identical numbers correspond to excitation with the same amplitude. Accordingly, for example, the four elements of index 1 at the center are all excited with the same amplitude. FIG. 5a also shows that the radiating elements are generally divided between four quadrants 152, 154, 156 and 158 which are excited in the same manner.

Figure 7:
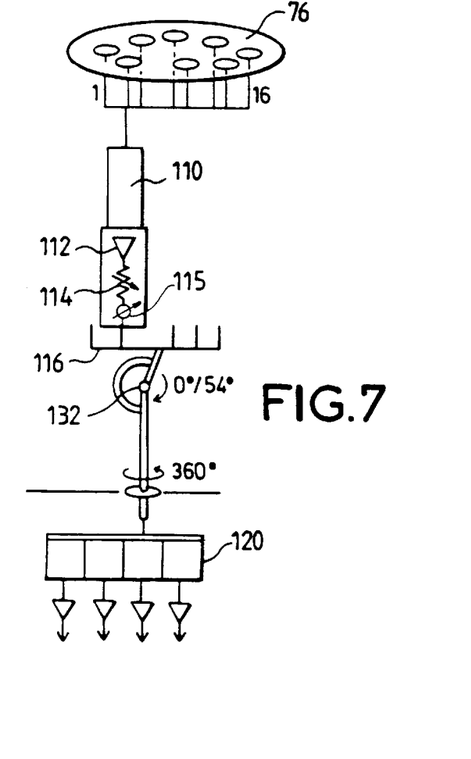
FIG. 7 is a diagram showing how a receive antenna from FIG. 5 is controlled.

FIG. 7 shows the circuit for processing the signals received by the panel of radiating elements 76 allocated to reception.

This circuit includes filters 110, low-noise amplifiers 112, variable attenuators 114 and variable phase-shifters 115. The function of the attenuators 114 and the phase-shifters 115 is the same as that of the attenuators 104 from FIG. 6, namely matching the radiation pattern to the position of the satellite relative to the area. The use of phase-shifters in the receiver optimizes beam forming; it does not penalize the link budget because the phase-shifters are on the output side of the low-noise amplifiers 112.

As in FIG. 6, the attenuators 114 and the phase-shifters 115 are controlled in accordance with the position of the satellite relative to the area.

A passive combiner 116 adds the signals supplied by the attenuators 114 and the phase-shifters 115.

The output signals of the combiner 116 are fed to a multiplexer 120 which separates the RXF and RXR signals. In this example, there are three RXF signal bands and one RXR signal band, in a similar manner to the FIG. 6 example. Of course, and also as in the FIG. 6 example, the distribution of the RXF and RXR signal bands can be different.

Note that, as shown in FIGS. 5, 6 and 7, the cables or electrical conductors pass through a rotary joint 130, 132 and that these cables are subject to rotations corresponding to the adjustments in elevation and in azimuth.

The radiation pattern is reconfigured as a function of elevation by a beam-forming network based on ferrite or MMIC (Monolithic Microwave Integrated Circuits). A ferrite-based circuit is preferably used for the transmit antenna, a circuit of this kind being better suited to forming low-loss beams after power amplification. The power amplification is provided by SSPAs which have a low efficiency and therefore dissipate a large amount of heat. It is therefore preferable to have this circuit far away from the panel 72, which generally has limited heat dissipation means; the circuit is therefore installed under the "Earth" panel 134 (FIG. 5), which is always pointed towards the center of the Earth and has greater heat dissipation means.

The receive beam-forming network uses the MMIC technology. The low-noise amplifiers are disposed near the radiating panel to minimize $I^2R$ losses due to the connections.

Mechanical pointing of the plate 72 is particularly advantageous, as compared to electronic pointing, because it is not necessary to use oversize panels of radiating elements 74 and 76.

The absence of electronic pointing makes best possible use of the signal resources to form the beams over a wide bandwidth. In particular, because of the absence of electronic pointing, there is no frequency dispersion associated with the absence of phase gradient for pointing.

The pitch of the array of radiating elements can be in the order of $0.9\lambda$. This easily prevents the formation of array lobes. Furthermore, this distance between adjacent radiating elements facilitates laying out the various control elements and limits coupling. Moreover, for a given size of the panels 74, 76, the number of radiating elements is small compared to an active antenna for which the pitch of the array is approximately $0.6\lambda$, which limits the requirements for inspection and cost.

Mechanical pointing of the panel towards the active area limits to ±12° the active area of the pattern in which the signals are transmitted by a panel of radiating elements. In this way, within an area, signals with right circular polarization can be isolated correctly from signals with left circular polarization to achieve a polarization isolation in excess of 20 dB.

Use of a ferrite-based transmit beam-forming network means that the active area of the antenna can be matched to the required pattern.

This always produces a Gaussian pattern and the secondary lobes are at a very low level, regardless of the shape of the pattern and the pointing angle. The isolation between adjacent areas is therefore optimum.

An apodized law is used for transmission and eliminates secondary lobes, as well as circumventing problems connected with the differential transfer functions of the amplifiers when the latter are operating below their nominal operating point.

Figure 8:
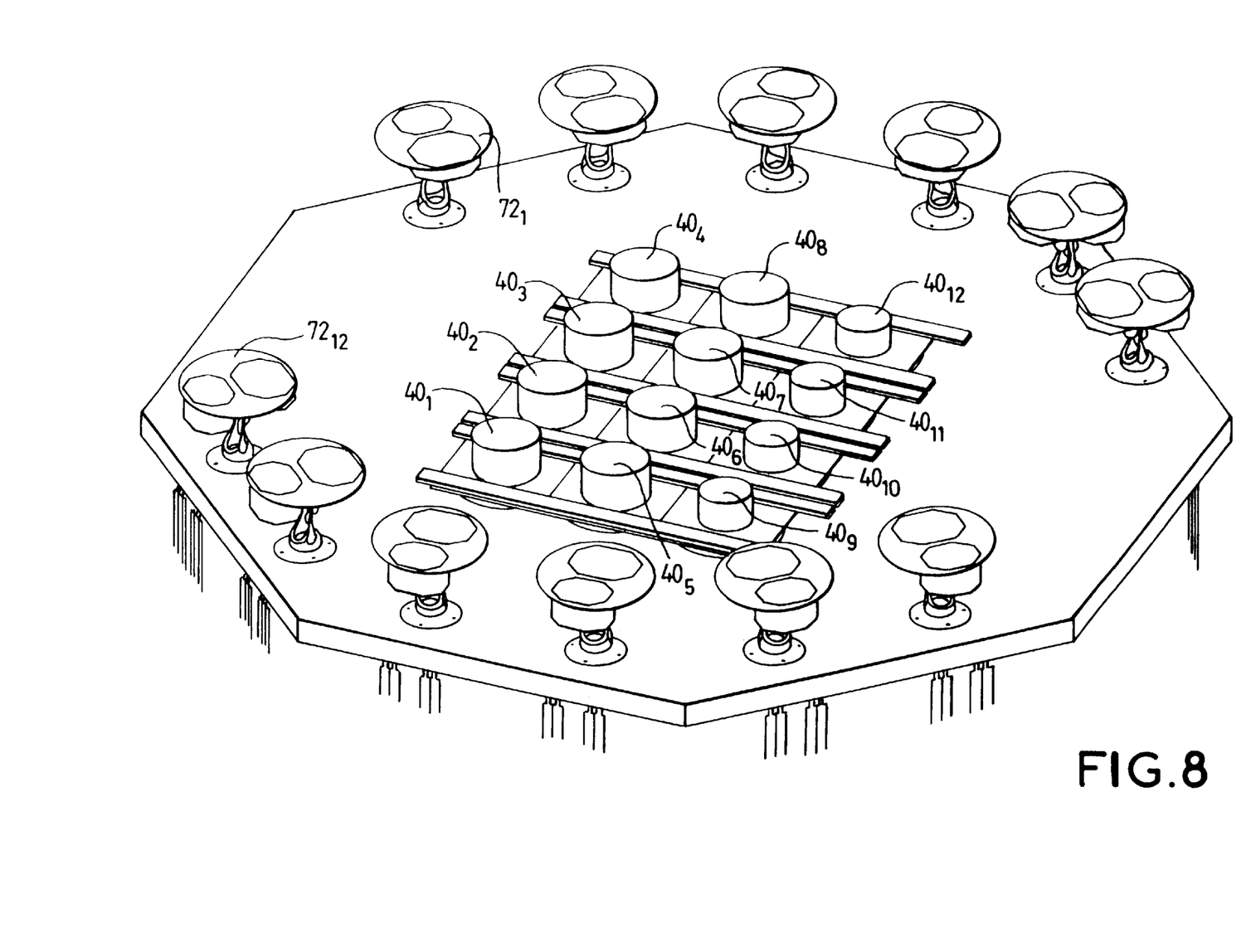
FIG. 8 is a diagram showing all the antennas on a satellite of the system of the invention.

FIG. 8 shows all of the antennas on the satellite 22, namely 12 antennas with a plate 72 that is pointed mechanically and reconfigured electronically and 12 panels carrying active antenna radiating elements, each active antenna radiating element panel being allocated to six areas.

In this example, the four panels $40_1$, $40_2$, $40_3$, $40_4$ are for the TXF signals, the panels $40_5$ through $40_8$ are for the TXR signals and the remaining four panels $40_9$ through $40_{12}$ are for the RXR and RXF signals. The TX connections are separated from the RX connections to allow filtering to prevent the TX signals interfering with the RX signals. The TXF signals are not transmitted by the same panels as the TXR signals, because their levels are significantly different:

signals must be transmitted towards the users at high levels because the antennas are less sensitive than those of the connection stations 20.

However, the same receive panels can be used for the signals from the connection stations and from users because in general there is no intermodulation between the low-noise amplifiers.

What is claimed is:

1. A telecommunications system in which the Earth is divided into a plurality of areas, the system comprising a spacecraft including a transmit and receive system allocated to said areas for effecting communications within said areas, wherein each of said areas is designated as a first category or a second category, said areas of said first category are allocated signals having respective polarizations and carrier frequencies such that two adjacent areas of the first category are allocated signals having different polarizations or carrier frequencies, and said areas of said second category are allocated signals having all available polarizations and all available carrier frequencies.

2. A system according to claim 1, wherein the polarization of the signals is circular.

3. A system according to claim 1, wherein at least two separate bands of carrier frequencies are provided for the signals, and the widths of the separate bands being equal or unequal.

4. A system according to claim 1, wherein the areas of the first category are allocated to low call densities and in that the areas of the second category are allocated to higher call densities.

5. A system according to claim 1, wherein in each of said areas, the signals are transmitted and received by users and by at least one connection station.

6. A system according to claim 5, wherein the separate areas communicate via terrestrial links between connection stations.

7. A system according to claim 1, wherein said transmit and receive system comprises a plurality of transmit and receive antennas allocated to said areas of the first category transmit for receiving and transmitting only signals having the polarization and the frequencies provided for said areas of the first category.

8. A system according to claim 1, wherein the spacecraft comprises a satellite in low Earth orbit, said transmit and receive system comprises a plurality of transmit and receive antennas provided for each of said areas, and each of said transmit and receive antennas is pointed towards an associated area for as long as the satellite remains in view of the associated area.

9. A system according to claim 8, wherein said transmit and receive antennas which are associated with said areas of the first category employ electronic pointing and reconfiguration.

10. A system according to claim 9, wherein said transmit and receive antennas comprise a set of radiating elements.

11. A system according to claim 5, wherein for areas of the first category, said transmit and receive system comprises a plurality of active transmit and receive antennas which employ electronic pointing and reconfiguration, and said transmit and receive antennas comprise sets of radiating elements for receiving signals from the connection station and from the users.

12. A system according to claim 5, wherein for areas of the first category, said transmit and receive system includes a plurality of active transmit and receive antennas which employ electronic pointing and reconfiguration, and said transmit and receive antennas comprise radiating elements for transmitting to users and radiating elements for transmitting to connection stations.

13. A system according to claim 8, wherein each of said transmit and receive antennas which are associated with said areas of the second category include mechanical means for pointing the antenna towards the area.

14. A system according to claim 13, wherein each of the said transmit and receive antennas includes means for modifying the radiation pattern as a function of the relative position of the spacecraft and the corresponding area in order to match the pattern to the shape of the area as seen by the antenna.

15. A system according to claim 14, wherein said transmit and receive antennas include radiating elements and the means for modifying the radiation pattern modify the pattern by modifying the amplitudes of the signals fed to the radiating elements.

16. A system according to claim 14, wherein said transmit and receive antennas include radiating elements and the means for modifying the radiation pattern modify the pattern by modifying the amplitudes and the phases of the signals fed to the radiating elements.

17. A system according to claim 15, a plurality of said radiating elements receive the same amplitude.

18. A system according to claim 13, said transmit and receive antennas have a surface that can be oriented by means of an azimuth motor and an elevation motor.

19. A system according to claim 13, wherein said transmit and receive antennas include a transmit part and a receive part which are separate.

20. A system according to claim 13, wherein said transmit and receive antennas include a ferrite-based beam-forming circuit is provided for transmission.

21. A system according to claim 13, the transmit and receive antennas include a set of radiating elements arranged on an elongate surface.

22. A transmit-receive system on a spacecraft for use in a telecommunications system in which the Earth is divided into a plurality of areas within which communications are effected via the transmit-receive system, the areas being designated as a first category having low call densities or a second category having high call densities, the transmit-receive system comprising:

a first transmit-receive antenna allocated to one of the areas of the first category; and a second transmit-receive antenna allocated to one of the areas of the second category, said fist and second transmit-receive antenna being different antenna types transmit-receive antenna, wherein said areas of said first category are allocated signals having respective polarizations and carrier frequencies such that two adjacent areas of the first category are allocated signals having different polarizations or carrier frequencies, and said areas of said second category are allocated signals having all available polarizations and all available carrier frequencies.

23. A transmit-receive system according to claim 22, wherein the spacecraft is a satellite in low Earth orbit and said first and second transmit-receive antennas are pointed towards the areas respectively associated with the first and second transmit-receive antennas as long as the satellite remains in view of that area, the first transmit-receive antenna includes means for electronic pointing and reconfiguration and the second antenna includes means for mechanically pointing the antenna towards the area.

24. A system according to claim 23, wherein the second antenna includes means for electronically reconfiguring a shape of the transmit and receive pattern.

25. A telecommunication method in which the Earth is divided into a plurality of areas within which communications are effected by transmit and receive means on a spacecraft allocated to communication within said areas, wherein each of the areas is designated as being a first category or a second category, the method comprising:

allocating to the areas of the first category signals having respective polarizations and carrier frequencies such that two adjacent areas of the first category are allocated signals having different polarizations or carrier frequencies, and allocating to the areas of the second category signals having all available polarizations and all available carrier frequencies.

26. A method according to claim 25, wherein the areas of the first category are allocated to low call densities and the areas of the second category are allocated to higher call densities.

* * * * *